(12) United States Patent
Bill

(10) Patent No.: US 10,336,473 B2
(45) Date of Patent: Jul. 2, 2019

(54) BRAKE TEMPERATURE PREDICTION AND COOLING TIME FUNCTIONALITY

(71) Applicant: Airbus Operations Limited, Bristol (GB)

(72) Inventor: Andrew Bill, Bristol (GB)

(73) Assignee: Airbus Operations Limited, Bristol (GB)

( * ) Notice: Subject to any disclaimer, the term of this patent is extended or adjusted under 35 U.S.C. 154(b) by 112 days.

(21) Appl. No.: 15/497,563

(22) Filed: Apr. 26, 2017

(65) Prior Publication Data

US 2017/0305577 A1    Oct. 26, 2017

(30) Foreign Application Priority Data

Apr. 26, 2016 (GB) .................................. 1607256.3

(51) Int. Cl.
| | | |
|---|---|---|
| *B64F 5/60* | (2017.01) | |
| *B60T 17/22* | (2006.01) | |
| *F16D 65/847* | (2006.01) | |
| *F16D 66/02* | (2006.01) | |

(Continued)

(52) U.S. Cl.
CPC .................. *B64F 5/60* (2017.01); *B60T 5/00* (2013.01); *B60T 17/18* (2013.01); *B60T 17/22* (2013.01);
(Continued)

(58) Field of Classification Search
CPC . B60T 5/00; B60T 17/18; B60T 17/22; B60T 17/221; B60T 2210/30;
(Continued)

(56) References Cited

U.S. PATENT DOCUMENTS

| | | | | |
|---|---|---|---|---|
| 4,592,452 A | * | 6/1986 | Merle ................... | F16D 65/847 188/264 AA |
| 7,596,434 B2 | * | 9/2009 | Greene .................... | B60T 8/00 244/110 A |

(Continued)

FOREIGN PATENT DOCUMENTS

| | | |
|---|---|---|
| DE | 39 40 456 | 6/1991 |
| DE | 10 2011 016 126 | 10/2012 |

(Continued)

OTHER PUBLICATIONS

William Strunk Jr. and E. B. White, The Elements of Style, 3rd Edition, all pages. (Year: 1979).*

*Primary Examiner* — Calvin Cheung
(74) *Attorney, Agent, or Firm* — Nixon & Vanderhye P.C.

(57) ABSTRACT

A brake cooling period prediction system for predicting a brake cooling period following a braking event, and including a sensor apparatus in communication with a prediction apparatus. The sensor apparatus has a torque sensor for measuring the torque reacted by a brake during a braking event; a wear sensor for measuring a wear state of the brake; and an environmental sensor for measuring at least one ambient condition of the environment of the brake. The prediction apparatus includes a memory storing information relating to the thermal behavior of the brake; and a controller configured to receive a torque measurement, a wear measurement and an ambient condition measurement from the sensor apparatus; and predict a cooling period based on the received torque, wear and ambient condition measurements, and the information relating to the thermal behavior of the brake.

25 Claims, 4 Drawing Sheets

(51) Int. Cl.
*B60T 5/00* (2006.01)
*B60T 17/18* (2006.01)
*B64C 25/42* (2006.01)
*F16D 66/00* (2006.01)
*F16D 65/78* (2006.01)

(52) U.S. Cl.
CPC ............ *B60T 17/221* (2013.01); *B64C 25/42* (2013.01); *F16D 65/847* (2013.01); *F16D 66/021* (2013.01); *B60T 2210/30* (2013.01); *F16D 2065/783* (2013.01); *F16D 2066/001* (2013.01); *F16D 2066/005* (2013.01)

(58) Field of Classification Search
CPC ..... B64C 25/42; F16D 65/847; F16D 66/021; F16D 2066/001; F16D 2066/005
See application file for complete search history.

(56) References Cited

U.S. PATENT DOCUMENTS

| | | | | |
|---|---|---|---|---|
| 2008/0121475 | A1* | 5/2008 | Bhaskara | ............. F16D 65/847 188/264 CC |
| 2008/0236269 | A1 | 10/2008 | Howell et al. | |
| 2009/0114488 | A1 | 5/2009 | Bailey et al. | |
| 2009/0125286 | A1 | 5/2009 | Waltz | |
| 2009/0152055 | A1* | 6/2009 | Cox | ....................... F16D 65/827 188/71.6 |
| 2010/0030490 | A1* | 2/2010 | Wright | ..................... F16D 66/02 702/34 |
| 2013/0092787 | A1* | 4/2013 | Polubinski | .............. B64C 25/42 244/50 |
| 2015/0286215 | A1 | 10/2015 | Alvarado, Jr. et al. | |
| 2016/0221550 | A1* | 8/2016 | Murata | ................... B60T 7/042 |
| 2016/0356331 | A1* | 12/2016 | Bill | ......................... H02P 29/60 |

FOREIGN PATENT DOCUMENTS

| | | |
|---|---|---|
| EP | 0 594 113 | 4/1994 |
| EP | 1 730 414 | 12/2006 |
| EP | 1950111 | 7/2008 |
| EP | 2 468 596 | 6/2012 |
| EP | 2 743 534 | 6/2014 |
| FR | 2 849 636 | 7/2004 |
| WO | 2005090821 | 9/2005 |
| WO | 2006/072802 | 7/2006 |
| WO | 2006/085047 | 8/2006 |

* cited by examiner

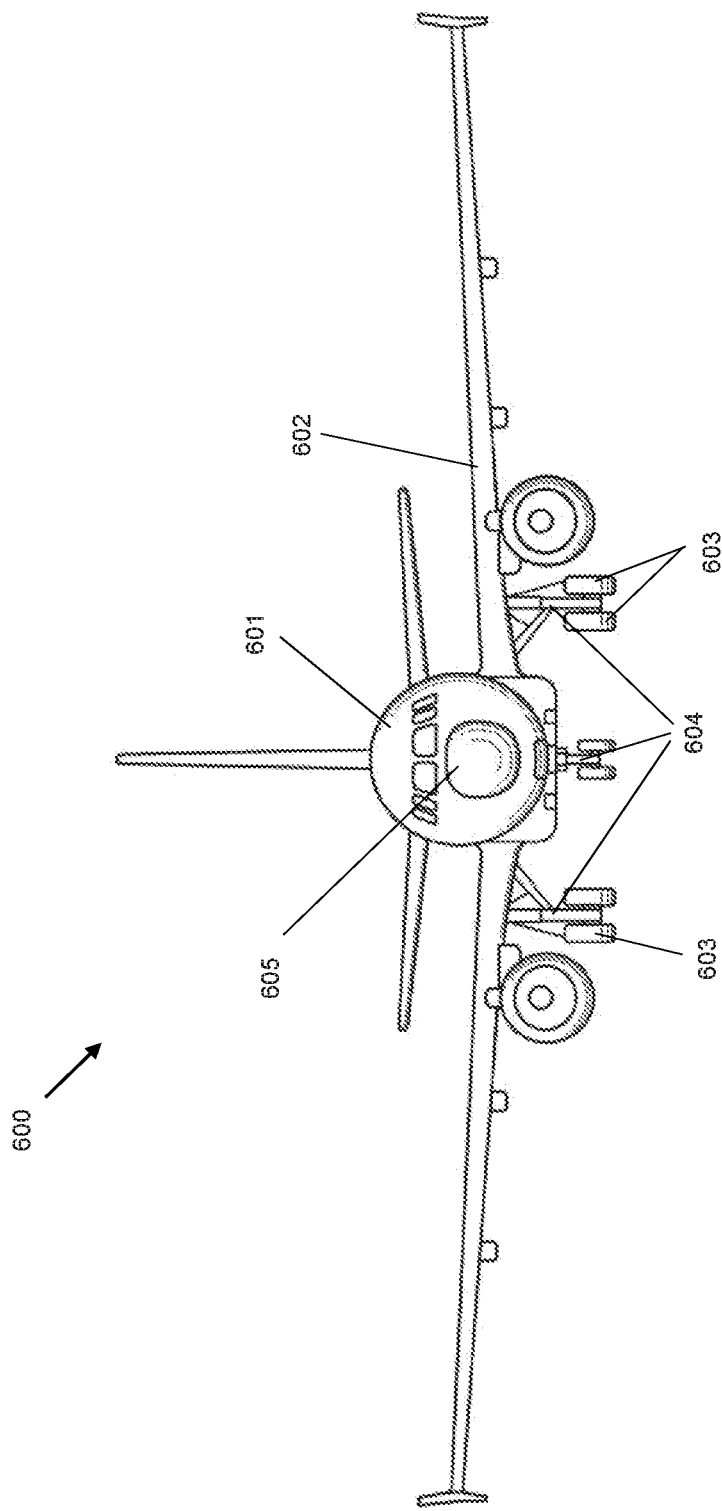

BRAKE TEMPERATURE PREDICTION AND COOLING TIME FUNCTIONALITY

RELATED APPLICATION

This application claims priority to Great Britain patent application no. 1607256.3 filed Apr. 26, 2016, the entire content of this application is incorporated by reference.

TECHNICAL FIELD

The present invention relates to a sensor apparatus and a prediction apparatus for use in predicting a brake cooling period following a braking event, and in particular relates to a sensor apparatus and a prediction apparatus for use in predicting a cooling period of an aircraft brake following a braking event.

BACKGROUND

Regulations require aircraft brakes to be able to handle an aborted takeoff at any moment prior to the plane leaving the runway. Brakes should not exceed a specified temperature, to avoid performance degradation, so the regulations prohibit an aircraft from taking off if its brakes are too hot (e.g. above 400° C.). To ensure that the brakes are cool enough even after use during taxiing out to the runway, it is recommended that an aircraft is not dispatched if its brakes are above a predefined temperature (e.g. 150° C., as measured by a brake temperature sensor), which is significantly lower than the maximum permitted take-off temperature and allows for temperature increase during taxi braking.

Currently, the temperature of each brake pack on an aircraft is monitored using thermocouples placed in the brake pack which provide temperature measurements to a brake temperature monitoring system (BTMS) comprised in the avionics systems of the aircraft. The BTMS provides temperature information based on the measured temperature of each brake pack on the aircraft to the flight crew, to enable them to determine whether or not the brakes are cool enough to permit the aircraft to take off.

When all of the brake temperature sensors (i.e. the thermocouples) on an aircraft are functional, it is therefore not necessary to calculate a brake cooling time. However, for some aircraft a protocol (MMEL) exists which covers situations in which one or more brake temperature sensors are not functional (as well as other BTMS partial failure scenarios), and which may allow the aircraft to take off despite the non-functional temperature sensor(s) (or other partial failures).

For some cases the MMEL specifies that one when or more brake temperature sensors are non-functional, manual temperature measurements should be obtained for all brakes on the landing gear having the non-functional sensor(s). Manual temperature measurements must be taken from outside the brake pack, and so do not represent the same quantity as the measurements obtained by the BTMS sensors in the brake packs, but they can be used to qualitatively compare the temperature of different brakes on an aircraft.

If the manual temperature measurements for all of the brake packs having non-functional sensors are less than the manual temperature measurements for the hottest brake having a functional temperature sensor, then the MMEL permits a take-off determination to be made based only on the functional temperature sensors, and does not require a cooling time to be calculated. In all other cases (and in cases where manual temperature measurements are not obtained), the MMEL requires a brake cooling time to be calculated and applied, according to rules provided in the MMEL. The MMEL cooling time calculation rules are conservative to ensure that all brakes (including those with unknown temperatures, which may be hotter than the other brakes) have cooled to below 150° C. before aircraft dispatch. As a result of the conservativeness built into the MMEL cooling time calculation rules, an aircraft with a non-functional brake temperature sensor may wait significantly longer before being permitted to take-off than would have been the case if all of its brake temperature sensors had been functional.

US 2006/0241819 describes a method to compute brake cooling times by obtaining brake temperature measurements at two points in time (as determined using a timer), calculating a rate of cooling based on the measurements, and comparing the calculated rate to a stored temperature profile for brake cooling at an appropriate ambient temperature. A crude estimate of cooling time is determined based on this comparison. However; the method of US 2006/0241819 requires a functional brake temperature sensor and therefore cannot be used as an alternative to the MMEL calculation rules in situations where one or more brake temperature sensors of an aircraft are non-functional.

An improved system for predicting a brake cooling time is therefore desired.

SUMMARY

A first aspect of the present invention provides an aircraft comprising a torque sensor for measuring the torque reacted by a brake during a braking event; a wear sensor for measuring a wear state of the brake; an environmental sensor for measuring at least one ambient condition of the environment of the brake; and a brake cooling prediction apparatus for predicting a brake cooling period following a braking event involving that brake, when measured values of the temperature of the brake are not available at least in respect of a time period including the braking event and the time of the predicting. The brake cooling prediction apparatus comprises a memory storing information relating to the thermal behaviour of the brake, and a controller configured to receive a torque measurement from the torque sensor; receive a wear measurement from the wear sensor; receive an ambient condition measurement from the environmental sensor; and predict a cooling period required for the brake to reach a predetermined temperature following the braking event, based on the received torque measurement, the received wear measurement, the received ambient condition measurement, and the information relating to the thermal behaviour of the brake.

Optionally, the aircraft further comprises a temperature sensor for measuring a temperature of the brake.

Optionally, the environmental sensor is for measuring one or more of: ambient temperature; air flow, wind direction, wind speed.

Optionally, the brake is an aircraft brake.

Optionally, the controller is configured to predict a cooling period by determining a maximum brake temperature as a result of the braking event, and by determining a cooling rate. The controller may be configured to determine the maximum brake temperature by determining an amount of energy input to the brake during the braking event, based on the received torque measurement. The controller may be configured to determine the maximum brake temperature by determining a thermal mass of a component of the brake, based on the received wear measurement. Optionally, the controller is configured to determine the cooling rate based on the determined maximum temperature, the received ambient condition measurement, and the stored information relating to the thermal behaviour of the brake.

Optionally, when the aircraft further comprises a temperature sensor for measuring a temperature of the brake, the controller is further configured to receive a temperature measurement from the temperature sensor and to update the information relating to the thermal behaviour of the brake based on the received temperature measurement. The controller may be configured to update the information by determining a correction factor based on the received temperature measurement and applying the determined correction factor to the information. The controller may be configured to store the received temperature measurement, and a time associated with the received temperature measurement in the memory, to create or update a time-series of brake temperature measurements stored in the memory.

Optionally, the controller is further configured to receive an indication of a cooling fan state, and to predict the cooling period based additionally on the received indication of a cooling fan state.

Optionally, the information relating to the thermal behaviour of the brake comprises one or more of: information relating to the past thermal behaviour of the brake; a time-series of measurements of the temperature of the brake; a mathematical model of the brake; a look-up table; a mathematical relationship relating any two or more of: torque, wear, ambient condition; cooling fan state; information relating the thermal behaviour of the brake to the thermal behaviour of a further brake.

Optionally, the controller is further configured to receive a measurement of a temperature of a further brake, and to predict the cooling period based additionally on the received further brake temperature measurement. The memory may further store information relating the thermal behaviour of the brake to the thermal behaviour of the further brake. The controller may be further configured to predict the cooling period based additionally on the information relating the thermal behaviour of the brake to the thermal behaviour of the further brake. The further brake may be on the same axle as the brake.

Optionally, the information relating to the thermal behaviour of the brake is based on the type of the brake.

Optionally, when the aircraft further comprises a temperature sensor for measuring a temperature of the brake, the aircraft further comprises a brake temperature monitoring system, BTMS, wherein the prediction apparatus is configured to provide a predicted cooling period to the BTMS. The prediction apparatus may be configured to estimate a current brake temperature based on the received torque measurement, the received wear measurement, the received ambient condition measurement, and the information relating to the thermal behaviour of the brake. The prediction apparatus may be configured to provide the estimated current brake temperature to the BTMS. A controller of the BTMS may be configured to select, as the basis for a determination of a current brake temperature and/or a predicted cooling period of a brake, one or more of: a temperature measurement received from the brake temperature sensor; a predicted cooling period received from the prediction apparatus; an estimated current brake temperature received from the prediction apparatus. The controller of the BTMS may be configured to perform the selection based on an operational state of the brake temperature sensor.

BRIEF DESCRIPTION OF THE DRAWINGS

Embodiments of the invention will now be described, by way of example only, with reference to the accompanying drawings, in which:

FIG. 6 is a schematic view of an example aircraft comprising a brake cooling prediction system according to an example.

DETAILED DESCRIPTION

Aircraft, and in particular aircraft of airlines, are equipped with a brake temperature monitoring system (BTMS) for measuring and monitoring the temperatures of the wheel brakes. A BTMS comprises a temperature sensor for each wheel brake of each of the sets of wheels which may be braked. Each of the temperature sensors is in communication with a central computer, which is usually located in the avionics bay of the aircraft. Temperature values measured by each of the temperature sensors may thereby be communicated to the cockpit, for use by the flight crew in determining whether the brakes are cool enough for the aircraft to push back from the stand. As mentioned above, if one or more of the BTMS temperature sensors on an aircraft is non-functional, it may be necessary to calculate a cooling time (hereinafter referred to as a "cooling period") after which all of the brakes of the aircraft will be below a preselected temperature (e.g. 150° C.).

The actual time required for a given brake to cool to a particular temperature depends on various factors, including starting temperature, mass of the brake, specific heat capacity of the brake, and ambient conditions (e.g. ambient temperature, air flow, wind speed and direction, etc.). The specific heat capacity of the brake depends on the type of materials comprised in the brake and is expected to remain substantially constant over the operational life of a brake. The starting temperature will depend on the amount of energy that has been input to the brake (e.g. during a braking event) and on ambient conditions. The mass of the brake will depend on the amount and type of material comprised in the brake, and in particular will be affected by the degree of wear of the brake discs. It is possible, in principle, to define characteristic thermal behaviour of any given brake (e.g. based on relationships between the above factors). The following disclosure seeks to provide a brake cooling period prediction system which combines information relating to the thermal behaviour of a given aircraft brake with current measurements of relevant factors, in order to generate a fast and accurate cooling period prediction for that brake.

Figure 1:
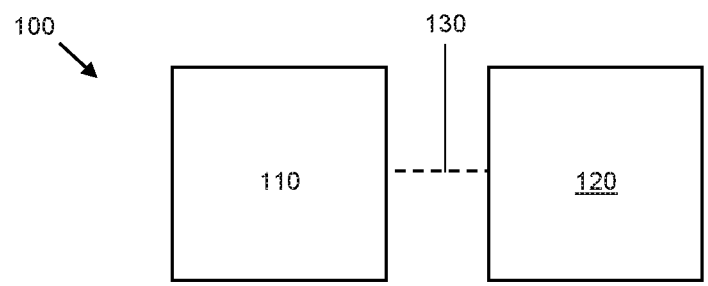
FIG. 1 shows a schematic view of a brake cooling prediction system according to an example.

FIG. 1 shows an example brake cooling period prediction system 100. The brake cooling period prediction system 100 can be used to predict a brake cooling period following a braking event, and in particular a brake cooling period of an aircraft brake following landing and/or taxiing of the aircraft. In the context of the current disclosure, the term "braking event" is used to refer to any operation of the brake which causes energy to be input to the brake and therefore the temperature of the brake to increase. A braking event may typically cause the brake to heat up beyond an acceptable take-off temperature. The operation of the brake will typically be, e.g., for the purpose of slowing an aircraft on which it is installed. A braking event will typically occur during landing and/or taxiing of the aircraft. In the current disclosure, the term "braking event" may be used to refer to a single operation of the brake, or to multiple consecutive operations of the brake. However; for multiple operations of the brake to be considered as comprised in a single braking event, the intervening time period between consecutive operations of the brake should be short enough that the brake has not cooled to a desired temperature in that intervening time period.

The brake cooling period prediction system 100 comprises a sensor apparatus 110, which is connected by a communications link 130 to a prediction apparatus 120. The communications link 130 may wired, wireless, or part wired and part wireless. The brake cooling period prediction system 100 is configured such that the prediction apparatus 120 is able to be located remotely from the sensor apparatus 10 when the brake cooling period prediction system 100 is installed on an aircraft. For example, the sensor apparatus 110 may be located on or in a brake pack, whilst the prediction apparatus 120 is located on or in a fuselage of the aircraft (e.g. in an avionics bay of the aircraft). This means that the prediction apparatus 120 can advantageously be provided in an environment which is less harsh than the immediate environment of the brake pack.

The brake cooling period prediction system 100 can be comprised in an aircraft avionics system, or can be connectable to an aircraft avionics system in any suitable manner, such that the brake cooling period prediction system 100 is able to communicate measured temperature values to the aircraft avionics system. For example, the brake cooling period prediction system 100 may be comprised in or connectable to a controller of a BTMS of the aircraft. At least some components of the brake cooling period prediction system 100 can be configured to receive power via a connection to an aircraft avionics system.

Figure 2A:
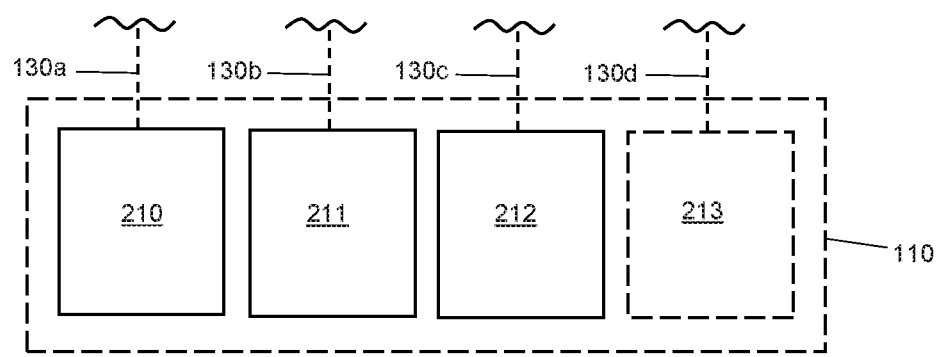
FIG. 2a shows a schematic view of a sensor apparatus according to an example.

FIG. 2a shows the sensor apparatus 110 in more detail. The sensor apparatus 110 is for use in predicting a brake cooling period following a braking event, e.g. a cooling period of an aircraft brake following an event involving landing and/or taxiing of the aircraft. The sensor apparatus 110 comprises a torque sensor 210, for measuring the torque reacted by a brake during a braking event; a wear sensor 211, for measuring a parameter relating to a wear state of the brake (e.g. brake disc thickness, brake disc mass, or any other measurable parameter from which a wear state of the brake can be determined); and an environmental sensor 212, for measuring at least one ambient condition of the environment of the brake. In the context of this disclosure the "environment" of the brake is used to refer to the region surrounding that brake and any elements comprised in that region and/or forces acting in that region. The environment of a given brake should be considered to include all elements external to the brake which can potentially affect the cooling period of that brake. It can include both natural elements (e.g. ambient temperature, wind, etc.) and artificial elements (e.g. other aircraft components, cooling fans or other items of airport equipment, etc.). The sensor apparatus 110 may optionally also comprise a temperature sensor 213, for measuring a temperature of the brake.

The torque sensor 210 is configured to transmit a measurement signal containing information about the torque reacted by a brake during a braking event to the prediction apparatus 120 via a communications link 130a. The wear sensor 211 is configured to transmit a measurement signal containing information about a parameter relating to the wear state of a brake to the prediction apparatus 120 via a communications link 130b. The environmental sensor is configured to transmit a measurement signal containing information about at least one ambient condition of the environment of a brake to the prediction apparatus 120 via a communications link 130c. The temperature sensor 213 is configured to transmit a measurement signal containing information about a temperature of a brake to the prediction apparatus 120 via a communications link 130d. Each of the communications links 130a-d is comprised in the communications link 130 of FIG. 1. Each of the communications links 130a-d may be wired or wireless. One or more of the communications links 130a-d may be combined into a single wired or wireless communications link for at least part of the transmission path between the sensor apparatus 110 and the prediction apparatus 120.

The torque sensor 210 is configured to measure the torque reacted by a brake and transmit measured torque values to the prediction apparatus 120. In some examples the torque sensor 210 is configured to transmit a series of torque values during the course of a braking event. In other examples the torque sensor 210 is configured to measure a total torque reacted by a brake during a braking event and to transmit a total torque value for that braking event to the prediction apparatus 120. The torque sensor 210 can be of any suitable design. For example, on an aircraft having a classic bogie arrangement, the torque sensor 210 can comprise a Torque Pin of strain gauge type, located on a brake torque rod. On an aircraft without a bogie, it is proposed to use an optical load sensor to measure torque on an axle to which the brake is mounted.

The wear sensor 211 is configured to measure a wear state of a brake. For example, in a multi-disc aircraft brake pack, material is removed from the discs (due to frictional forces between the stators and rotors) during operation of the brake. Over the life time of a brake pack, a sufficient amount of material will be removed from the discs to have a non-negligible effect on the mass of the brake. This is particularly true in the case of carbon brake discs. The wear sensor 211 is configured to measure a parameter relating to the wear of the brake in such a way that the measurements relating to the parameter can be used to determine a current mass of the brake. In some examples the wear sensor 211 is configured to measure the thickness of one or more brake discs comprised in the brake, and to transmit a thickness value for the one or more brake discs to the prediction apparatus 120. It will be appreciated that, provided that the geometry and material properties of the brake disc are known, such a thickness value can enable the calculation of the mass of the one or more brake discs. In some examples, the thickness of all of the brake discs comprised in a brake pack is measured as a whole.

The wear sensor can be of any suitable design. For example, in the case of a classic hydraulic aircraft brake, the wear sensor 211 can comprise a linear variable differential transformer (LVDT) sensor, or a Hall Effect sensor, configured to measuring the linear displacement (wear) of a component of the brake. Such a linear displacement sensor can be located, for example, on the rear of the brake piston housing. In the case of an electric brake comprising an e-brake controller, the brake wear is measured as part of the e-brake controller. This information can be made available to the prediction apparatus 120. In such examples the wear sensor 211 comprises an e-brake controller of the brake (i.e. the brake for which a cooling period is to be predicted).

The environmental sensor 212 is configured to measure an ambient condition of the environment of the brake, and to transmit a value for the measured ambient condition to the prediction apparatus 120. In some examples the environmental sensor 212 is configured to measure a plurality of ambient conditions of the environment of the brake. The ambient condition can be any environmental condition which could potentially affect the cooling period of a brake. For example, the environmental sensor 212 can be configured to measure one or more of: ambient temperature; air flow, wind direction, wind speed. A higher ambient temperature will increase the cooling period. An air flow (e.g. created by a cooling fan) will reduce the cooling period, by an amount dependent on the flow rate and volume. Similarly, a higher wind speed can reduce the cooling period for brakes located such that they are in the wind. Wind direction may affect whether or not a given brake is in the wind, and therefore whether or not that brake will experience an additional cooling effect as a result of the wind.

The environmental sensor 212 can comprise any sensor or combination of sensors suitable for measuring the ambient condition(s). For example, the environmental sensor 212 can comprise a temperature sensor, an airflow sensor, a wind speed sensor, a wind direction sensor, or any combination of such sensors. It is expected that, typically, the environmental sensor 212 will comprise plurality of sensors, which need not be located near to each other or near to the brake. For example, a controller of a brake cooling fan can measure an airflow generated by that fan, ambient local temperature can be measured by the BTMS and/or a further aircraft system. Wind data (wind speed, direction, ambient temp) can be measured by an aircraft system or can be provided by an airport system.

The temperature sensor 213, if present, is configured to measure a temperature of the brake and to transmit a measured temperature value to the prediction apparatus 120. In some examples the temperature sensor 213 is a temperature sensor associated with a BTMS of the aircraft. Indeed, in examples in which the system 100 is being used on an aircraft having a fully functional BTMS, it is expected that the temperature sensor 213 will be present and will comprise a temperature sensor associated with the BTMS. The temperature sensor 213 is located on or in the brake pack, and is arranged to obtain a measurement of the internal temperature of the brake pack. In some examples the temperature sensor 213 comprises a thermocouple. The temperature sensor 213 can be arranged to transmit a measured temperature value directly to the prediction apparatus 120. Alternatively, the temperature sensor 213 can be arranged to transmit a measured temperature value to a BTMS controller, which in turn transmits the measured temperature value to the prediction apparatus 230.

Figure 2B:
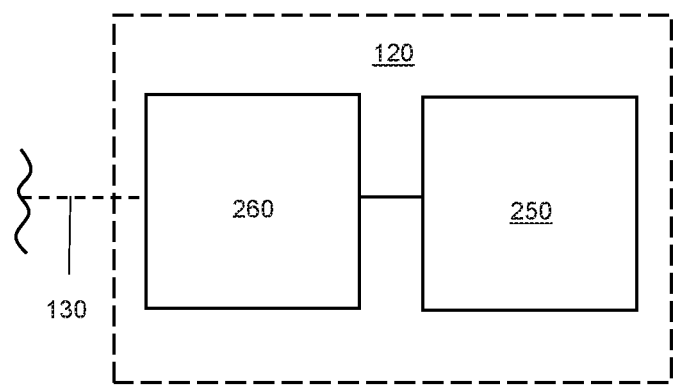
FIG. 2b shows a schematic view of a prediction apparatus according to an example.

FIG. 2b shows the prediction apparatus 120 in more detail. The prediction apparatus 120 is for use in predicting a brake cooling period following a braking event, e.g. a cooling period of an aircraft brake following an event involving landing and/or taxiing of the aircraft. The prediction apparatus 120 comprises a memory 250 and a controller 260. The memory 250 stores information relating to the thermal behaviour of the brake (i.e. the brake for which a cooling period is to be predicted) (hereinafter referred to as "brake thermal information"). The memory 250 can comprise any suitable implementation of a computer readable storage medium, such as a hard drive, flash memory, non-volatile memory, etc. The controller 260 is configured to receive a torque measurement, a wear measurement and an ambient condition measurement from a sensor apparatus (e.g. the sensor apparatus 110). In some examples, the prediction apparatus 120 is configured to receive measurements from a plurality of sensor apparatus, each of which is associated with a different brake of an aircraft on which the prediction apparatus 120 is installed. For example, the prediction apparatus 120 may receive measurements in respect of each individual brake comprised in an aircraft on which the prediction apparatus 120 is installed. In some examples the controller 260 is further configured to receive a temperature measurement from a sensor apparatus (e.g. the sensor apparatus 110). As mentioned above, in examples in which the system 100 is being used on an aircraft having a fully functional BTMS, the controller 260 may typically receive a temperature measurement from a temperature sensor comprised in or associated with the BTMS.

The controller 260 is further configured to predict a cooling period required for the brake to reach a predetermined temperature following a braking event, based on the received torque measurement, the received wear measurement, the received ambient condition measurement, and the brake thermal information.

FIG. 2b shows the memory 250 and controller 260 comprised in a single unit, which may, e.g., comprise a single housing containing the controller 260 and the memory 250. However; it is also possible for the memory 250 to comprise a separate unit from the controller, in which case the memory 250 will be connected to the controller 260 by a communications link (which may be wired or wireless). For example, the controller 260 may be implemented as a remote storage device.

Figure 3:
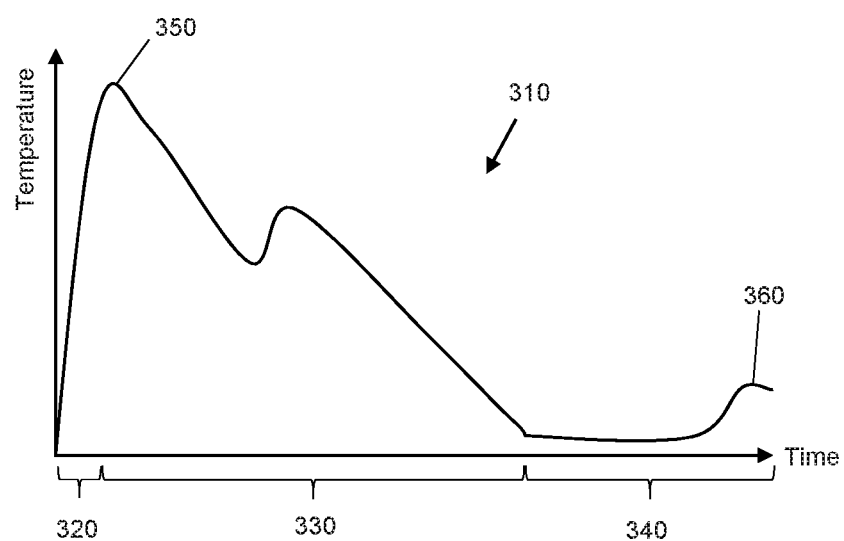
FIG. 3 shows an example plot of measured brake temperature against time for a first example aircraft brake.

The brake thermal information can comprise one or more of: information relating to the past thermal behaviour of the brake; a time-series of measurements of the temperature of the brake; a mathematical model of the brake; a look-up table; a mathematical relationship relating any two or more of: torque, wear, ambient condition; cooling fan state; etc. FIG. 3 shows an example of brake thermal information in the form of a plot 310 of a time-series of measurements of the temperature of a brake. The temperature measurements cover a first time period 320 during which a first braking event (represented by the peak 350) occurred (e.g. during landing and braking of the aircraft on which the brake is installed), a second time period 330 during which the brake was cooling following the first braking event (including a minor peak representing a second braking event during taxiing of the aircraft following landing), and a third time period 340 during which the brake was at ambient temperature (so no further cooling occurred), until a third braking event (represented by the peak 360) occurred (e.g. during taxiing before take-off).

When all external influences remain constant, the brake will cool in accordance with a characteristic cooling curve. The exact shape of this characteristic cooling curve will depend on the mass and specific heat capacity of the brake, the starting temperature, and the ambient conditions. In some examples the brake thermal information can comprise a set of characteristic cooling curves, corresponding to different combinations of these variables.

The thermal behaviour of a given brake will be unique to that brake on a fine scale. However; the thermal behaviour of brakes of the same type (i.e. brakes intended for use on the same landing gear of the same type of aircraft, and from the same manufacturer) is expected to be very similar. The thermal behaviour of brakes of the same type may be sufficiently similar that any differences can be considered negligible for the purposes of predicting a cooling period. The brake thermal information may therefore be based on the type of the brake. For example, an aircraft manufacturer may create predefined brake thermal information in respect of each different type of brake found on its aircraft, and may store in the memory of a given prediction apparatus only the predefined brake thermal information relating to the brake types for which that prediction apparatus receives measurements.

In some examples the controller 260 is further configured to receive an indication of a cooling fan state, e.g. from the cooling fan, from a device operated by ground crew, or from another aircraft system. The indication may indicate whether the cooling fan has been activated, or that it has been deactivated. For example, ground crew may communicate to the controller, directly from an electronic device used by the ground crew or via another system of the aircraft, that a cooling fan has been activated and directed at the brake. It will be appreciated that activating a cooling fan directed at a brake will reduce the cooling period for that brake. Therefore, in such examples the controller 260 is further configured to predict the cooling period for the brake based additionally on the received indication of a cooling fan state. This feature can be advantageous if a sensor apparatus is used which comprises an environmental sensor which is not capable of detecting that a cooling fan is blowing air at the brake.

In some examples the controller 260 is further configured to receive a temperature measurement from the sensor apparatus 110 (e.g. examples in which the sensor apparatus 110 comprises a temperature sensor 213). In some such examples the controller 260 is configured to store the received temperature measurement in the memory 250, e.g. as part of the brake thermal information. The controller 260 can be further configured to update the brake thermal information based on the received temperature measurement. For example, the controller 260 can be configured to store the received temperature measurement, and a time associated with the received temperature measurement in the memory 250, to create or update a time-series of brake temperature measurements stored in the memory 250. As another example, if the brake thermal information comprises a set of characteristic cooling curves, the shape of one or more of these curves can be updated to fit to the received temperature measurement. In some examples, the controller is configured to update the brake thermal information by determining a correction factor based on the received temperature measurement and applying the determined correction factor to the brake thermal information, e.g. in any suitable manner known in the art. Advantageously, continuously updating the brake thermal information in this manner can ensure that the brake thermal information continuously adapts to reflect any changes in the thermal behaviour of the brake.

In some examples the controller 260 is further configured to receive a measurement of the temperature of a further brake, e.g. from a sensor apparatus located on the further brake. For the sake of clarity and ease of distinction from the further brake, the brake (i.e. the brake for which a cooling period is to be predicted) will hereinafter be referred to as the "subject brake". In some such examples the controller 260 is configured to store the further brake temperature measurement in the memory 250, such that the memory additionally (i.e. as well as storing brake thermal information) stores information relating to the thermal behaviour of a further brake (further brake thermal information). In such examples, the further brake information will comprise a time-series of temperature measurements. However; the further brake information may alternatively or additionally comprise any of the information types described above in relation to the subject brake information.

The further brake can be any brake on the aircraft other than the subject brake. However, advantageous examples are envisaged in which the further brake is on the same axle as the subject brake. Brakes on the same axle are expected to experience very similar ambient conditions and loads, and therefore should exhibit similar cooling behaviour in any given situation, assuming similar environmental conditions. In situations where brakes on the same axle might experience significantly different environmental conditions (e.g. if one brake but not the other is in sunlight, if one brake but not the other is in an airflow), temperature measurements from other common axle brake pairs experiencing similar differences in environmental conditions can be used to correct for the effects of non-uniform environmental conditions. In a situation where current temperature measurements are available for a first brake on a given axle but are not available for a second brake on that axle (e.g. because the second brake has a non-functional temperature sensor), the current temperature measurements for the first brake can be used as a basis for predicting a cooling period for the second brake.

Figure 4:
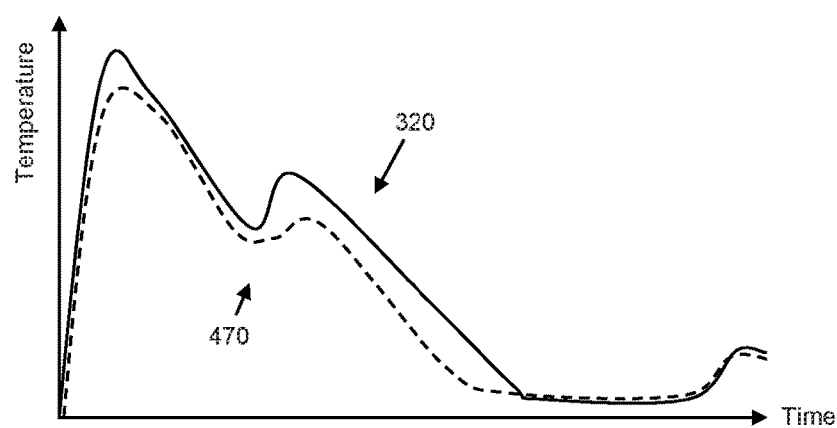
FIG. 4 shows an example plot of measured brake temperature against time for the first example aircraft brake and an example plot of measured brake temperature against time for a second example aircraft brake.

FIG. 4 shows an example of further brake thermal information in the form of a plot 470 of a time-series of measurements of the temperature of a further brake. FIG. 4a also includes the plot 320 of the time-series of measurements of the temperature of the subject brake. The plot 470 covers the same time period as the plot 320 and therefore includes the same braking events. In this example, the further brake is on the same axle as the subject brake, and therefore its thermal behaviour during the illustrated time period is very similar to the thermal behaviour of the subject brake in that time period.

The differences in thermal behaviour between two brakes on the same aircraft are expected to be substantially constant (at least over an expected operating time period for which brake temperature measurements are not available for the subject brake, e.g. because of a failed BTMS temperature sensor). A relationship between the subject brake and the further brake can therefore be determined. For example, when the further brake is at a given temperature $T_x$, the temperature of the subject brake can be assumed to be $T_x+y$, where y is a correlation factor relating the temperature of the subject brake to the temperature of the further brake.

Using historical temperature-time data for the further brake and the subject brake (or indeed any further brake and the subject brake), it is therefore possible to define a mathematical relationship relating the thermal behaviour of the subject brake to the thermal behaviour of the further brake, which can be used to, e.g., estimate a current temperature of the subject brake based on a current temperature of the further brake. The definition of such a mathematical relationship can be done by the controller 260, based on stored further brake thermal information, e.g. during a process of predicting the cooling period for the subject brake. Alternatively, a predefined mathematical relationship can be stored in the memory 250. Thus, in some examples in which the controller 260 additionally receives measurements of the temperature of a further brake, the subject brake thermal information comprises a mathematical relationship relating the thermal behaviour of the subject brake to the thermal behaviour of the further brake. Alternatively or additionally, a mathematical relationship relating the thermal behaviour of the subject brake to the thermal behaviour of the further brake can be comprised in further brake thermal information stored in the memory 250.

It will be appreciated that the manner in which the controller predicts the cooling period will depend on the nature of the brake thermal information. For example, if the brake thermal information comprises a look-up table, predicting the cooling period by the controller 260 may comprise comparing one or more of the received measurements to entries in the look-up table. As another example, if the brake thermal information comprises a mathematical relationship, predicting the cooling period by the controller 260 may comprise using one or more of the received measurements as inputs to the mathematical relationship.

In some examples the controller 260 is configured to predict a cooling period by determining a maximum brake temperature (i.e. the highest temperature experienced by the brake as a result of the braking event) and a cooling rate. The maximum temperature can be determined, for example, by determining an amount of energy input to the brake during the braking event. The amount of energy input to the brake during a braking event is proportional to the total amount of torque reacted by the brake during that braking event. The controller 260 can therefore determine the energy input based on the received torque measurement. The controller may be further configured to determine a maximum brake temperature by determining a mass of a component of the brake, based on the received wear measurement. The mass of the brake component depends on the amount and type of material comprised in the brake component. As discussed above, brake discs can experience a significant reduction in the amount of material they comprise, over the lifetime of the brake, and thus a significant change in their mass. The manner in which brake discs wear is well known, and the controller 260 can be programmed with appropriate information about a brake disc (e.g., geometry, material type, material properties) such that the controller 260 can determine the mass of the brake disc based on a received wear measurement. The information about the brake disc may be comprised in the brake thermal information.

If the total amount of energy input to the brake during a braking event is known, the brake temperature before the braking event is known, the specific heat capacity of the brake is known, and the mass of the brake is known, then the maximum brake temperature can be determined based on these values. In some situations (e.g. before a braking event during landing) it can be assumed that the brake temperature immediately before the braking event is equal to the ambient temperature in the brake environment. This ambient temperature will generally be available from the environmental sensor 212 of the sensor apparatus 110. Thus, in some examples the controller 260 is configured to determine a maximum brake temperature based on the received torque measurement, the received wear measurement and the received ambient condition measurement.

In other situations the brake temperature immediately before the braking event may be higher than ambient, for various reasons. Therefore, in some examples, the controller 260 is configured to determine a maximum brake temperature based on the received torque measurement, the received wear measurement and the brake thermal information, wherein the brake thermal information comprises, e.g. an estimated or determined initial temperature of the brake immediately prior to the braking event. Such an estimated or determined initial temperature can be, e.g., based on a predicted cooling period predicted in respect of a previous braking event, and/or based on a temperature of a further brake. Advantageously, the capability to determine a maximum brake temperature corresponding to a given braking event can enable an accurate cooling period for the brake to be predicted even if no brake temperature measurements are available for that brake for the time period of the braking event (e.g. because a temperature sensor on that brake was non-functional at the time of the braking event).

The controller 260 can be configured to determine a cooling rate based on a determined maximum brake temperature, which may have been determined in any of the ways discussed above, and on the brake thermal information. The determined cooling rate may comprise a cooling curve. A cooling rate may be determined over the duration of a predicted cooling period. A determined cooling rate need not be constant over the time period of the determined cooling rate.

As discussed above, the rate at which a brake will cool, assuming no further energy inputs, is a function of the maximum temperature, environmental conditions, the specific heat capacity of the brake and the mass of the brake. The specific heat capacity of the brake depends on the type of material comprised in the brake and is expected to remain substantially unchanged over the life of the brake. It can therefore be pre-programmed into the controller 260. An accurate mass of the brake can be determined by the controller 260 as described above, based on the received wear measurement. The environmental conditions can be determined by the controller 260 based on the received ambient condition measurement(s). For example, the controller can be configured to select and apply a correction factor (e.g. selected from a set of correction factors corresponding to various combinations of environmental conditions, which are stored in the memory 250) corresponding to current environmental conditions to the brake thermal information before using that brake thermal information as the basis of a cooling time period prediction. Alternatively, in a particular example in which the brake thermal information comprises a set of cooling curves corresponding to various combinations of environmental conditions, the controller 260 may be configured to select a cooling curve corresponding to the current environmental conditions for use as the basis of a cooling time period prediction.

In some examples the controller 260 is configured to determine a cooling rate for a subject brake based on a received measurement of the temperature of a further brake. In such examples the determination of the cooling rate may be additionally based on information relating the thermal behaviour of the subject brake to the thermal behaviour of the further brake.

For example, consider a brake having a first (initial) temperature $T_1$. A braking event then causes the brake temperature to rise to a maximum temperature $T_2$, which can be calculated as described above using the torque and wear measurements and the known brake characteristics of the subject brake. Then, cooling occurs at a particular rate dependent on the various factors described above. The cooling rate can be determined based on the determined maximum temperature $T_2$, the received ambient condition measurement(s), and the subject brake thermal information, e.g. in the manner described above. However; assuming that current temperature measurements are available for the further brake (which indicate the actual thermal behaviour of the further brake in the particular situation), such further brake temperature measurements, together with the information which relates the subject brake thermal behaviour to the further brake thermal behaviour, can be used to provide an additional input to the cooling rate determination.

For example, it may be the case during a given cooling period that a current temperature of the subject brake, as determined based on a further brake temperature measurement and the information relating the subject brake thermal behaviour to the further brake thermal behaviour, is lower or higher than the current temperature given by the determined cooling rate. In this situation the determined cooling rate can be recalculated based on the current subject brake temperature as determined based on a further brake temperature measurement and the information relating the subject brake thermal behaviour to the further brake thermal behaviour.

Figure 5:
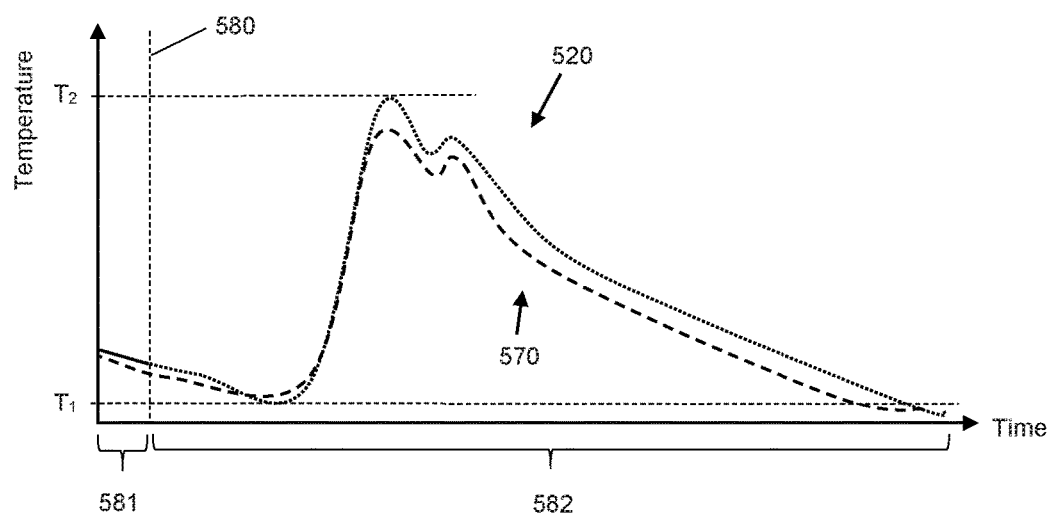
FIG. 5 shows an example plot of estimated brake temperature against time for the first example aircraft brake and an example plot of measured brake temperature against time for the second example aircraft brake.

FIG. 5 illustrates the use of further brake temperature measurements and information relating subject brake thermal behaviour to further brake thermal behaviour to predict a cooling period, in relation to the subject brake and the further brake to which the time-series data of FIG. 4 corresponds. FIG. 5 shows an example of further brake thermal information in the form of a plot 570 of a time-series of temperature measurements of the temperature of a further brake. The plot 570 covers a time period which commences immediately after the time period covered by the plot 470 of FIG. 4. The temperature measurements on which the plot 570 is based are received from a temperature sensor on the further brake. FIG. 5 also includes a plot 520 of a time-series of measurements of the temperature of the subject brake. The plot 570 covers the same time period as the plot 520 and therefore commences immediately after the time period covered by the plot 420 of FIG. 4. During a first part 581 of the time period of FIG. 5, the temperature measurements on which the plot 520 is based are received from a temperature sensor on the subject brake. However, during a second part 582 of the time period of FIG. 5, the temperature measurements on which the plot 520 is based are estimated by the controller 260 (e.g. because the temperature sensor on the subject brake ceased to function at the end of the first part 581). The change from measured to estimated temperature values is indicated on FIG. 5 by the plot 520 changing from a solid line to a dotted line.

Some of the estimated temperature values on which the plot 520 is based in the second part 582 of the time period are estimated by the controller based on the corresponding temperature measurements for the further brake, in addition to being based on the maximum temperature, the received ambient condition measurement(s) and the subject brake thermal information. In particular, the temperature values in the second part 582 up to and including $T_1$ (which is the temperature immediately prior to a braking event), and the temperature values in the second part 582 after $T_2$ (which is the maximum temperature), are determined based on a cooling rate which has been determined based on a received measurement of the temperature of the further brake and on information relating the thermal behaviour of the subject brake to the thermal behaviour of the further brake, e.g. in the manner described above. By contrast, the determination of $T_2$ is performed as described above in relation to the determination of a maximum temperature, and is not based on the further brake temperature measurements.

In some examples, e.g. examples in which the controller 260 is configured to store subject brake temperature measurements in the memory 250, if the stored temperature cannot be updated because an aircraft on which the system 100 is installed is depowered, then once the aircraft is repowered a new start temperature for the subject brake can be accurately determined, even if no current subject brake temperature measurements are available for the subject brake, based on a measured temperature of the further brake and on information relating the thermal behaviour of the subject brake to the thermal behaviour of the further brake (e.g. a mathematical relationship between the temperature of the further brake at a given time and the temperature of the subject brake at that time). In most cases the aircraft will be re-powered after several hours and all brakes will be at ambient temperature. However, this may not always be the case. Accurately determining an initial temperature on power-up can advantageously ensure that further temperature calculations based on the received torque and wear measurements are as accurate as possible.

FIG. 6 shows an aircraft 600 on which a brake cooling period prediction system according to the examples (e.g. the brake cooling period prediction system 100) is installed. The aircraft comprises a fuselage 601, wings 602, and main and nose landing gear 604. Two wheels 603 are attached to each landing gear 604. Each wheel 603 has an associated brake pack (not visible) for braking that wheel. Each brake pack comprises a sensor apparatus, e.g. the sensor apparatus 110 described above. The aircraft 600 therefore comprises four separate sensor apparatus. The aircraft 600 further comprises a prediction apparatus, which is configured to communicate with each of the four sensor apparatus. The prediction apparatus may be a prediction apparatus 120 as described above.

The aircraft 600 further comprises an avionics system 605, and in the particular example the prediction apparatus is comprised in the avionics system 605. The avionics system 605 is located in an avionics bay or compartment. In the particular example the avionics bay is in the nose of the aircraft below the cockpit, but it may be in a different location depending on the type of aircraft. The avionics system 605 comprises the electronic systems associated with flying the aircraft, including airborne communication and navigation systems and flight control systems. The avionics system 605 may comprise all of the electronics associated with communicating information to other parts of the aircraft 600. The prediction apparatus may be configured to separately generate and process signals relating to each individual sensor apparatus from which it receives measurements. However, alternative examples are possible in which at least some of the data processing and/or predicting for the different sensor apparatus is combined by the prediction apparatus.

Various alternative arrangements are possible for the prediction apparatus. For example, more than one prediction apparatus may be provided, e.g. a prediction apparatus may be provided for each individual sensor apparatus comprised in the aircraft 600, or there may be a prediction apparatus for each landing gear of the aircraft 600. There may be any number of prediction apparatus, up to and including the number of sensor apparatus. For example, an arrangement is envisaged in which a single prediction apparatus is provided in respect of each landing gear of the aircraft 600. In this example each prediction apparatus to receive four different sets of torque, wear and ambient condition measurements, one set from each individual sensor apparatus on its landing gear. The prediction apparatus may be configured to separately generate and process signals relating to each individual sensor apparatus on its landing gear. However, alternative examples are possible in which at least some of the data processing and/or predicting for the different sensor apparatus is combined by the prediction apparatus.

The aircraft 600 further comprises a BTMS (not shown), and in some examples the brake cooling period prediction system is configured to provide a predicted cooling period to the BTMS. In alternative examples, the brake cooling period prediction system is configured to estimate a current brake temperature based on the received torque measurement, the received wear measurement, the received ambient condition measurement, and the information relating to the thermal behaviour of the brake, and to provide the estimated current brake temperature to the BTMS. In such examples the BTMS can be configured to use the estimated current brake temperature received from the brake cooling period prediction system in place of a brake temperature measurement from a brake temperature sensor, e.g. in the event of failure of the brake temperature sensor.

For example, a controller of the BTMS can be configured to select, as the basis for a determination of a current brake temperature and/or a predicted cooling period of a brake, one or more of: a temperature measurement received from a brake temperature sensor; a predicted cooling period received from the brake cooling period prediction system; and an estimated current brake temperature received from the brake cooling period prediction system. The controller of the BTMS can be configured to perform the selection based on an operational state of the brake temperature sensor.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An aircraft comprising:
   a torque sensor configured to measure torque reacted by a brake during a braking event;
   a wear sensor configured to measure a wear state of the brake;
   an environmental sensor configured to measure at least one ambient condition of an environment of the brake; and
   a brake cooling prediction apparatus configured to predict a brake cooling period following a braking event involving the brake, when measured values of a temperature of the brake are not available at least in respect of a time period including the braking event and a time of predicting the brake cooling period, the brake cooling prediction apparatus comprising:
   a non-transitory memory storing information relating to a thermal behavior of the brake; and
   a controller configured to:
     receive a torque measurement from the torque sensor;
     receive a wear measurement from the wear sensor;
     receive an ambient condition measurement from the environmental sensor; and
     predict a cooling period required for the brake to reach a predetermined temperature following the braking event, based on the received torque measurement, the received wear measurement, the received ambient condition measurement, and the stored information relating to the thermal behavior of the brake.

2. The aircraft according to claim 1, further comprising a temperature sensor configured to measure a temperature of the brake.

3. The aircraft according to claim 2, wherein the controller is further configured to receive a temperature measurement from the temperature sensor and to update the information relating to the thermal behavior of the brake based on the received temperature measurement.

4. The aircraft according to claim 3, wherein the controller is configured to store the received temperature measurement, and a time associated with the received temperature measurement in the non-transitory memory, to create or update a time-series of brake temperature measurements stored in the non-transitory memory.

5. The aircraft according to claim 2, further comprising a brake temperature monitoring system (BTMS) wherein the brake cooling prediction apparatus is configured to provide the predicted cooling period to the BTMS.

6. The aircraft according to claim 5, wherein the brake cooling prediction apparatus is configured to estimate a current brake temperature based on the received torque measurement, the received wear measurement, the received ambient condition measurement, and the information relating to the thermal behavior of the brake, and to provide the estimated current brake temperature to the BTMS.

7. The aircraft according to claim 6, wherein a controller of the BTMS is configured to select, as the basis for a determination of at least one of a current brake temperature and a predicted cooling period of a brake, one or more of:
   the temperature measurement received from the brake temperature sensor;
   the predicted cooling period received from the prediction apparatus;
   the estimated current brake temperature received from the brake cooling prediction apparatus.

8. The aircraft according to claim 7, wherein the controller of the BTMS is configured to select one or more of the temperature measurements, the predicted cooling period and the estimated current brake temperature based on an operational state of the brake temperature sensor.

9. The aircraft according to claim 1, wherein the environmental sensor is configured to measure one or more of: ambient temperature; air flow, wind direction, and wind speed.

10. The aircraft according to claim 1, wherein the controller is configured to predict the cooling period by determining a maximum brake temperature as a result of the braking event, and by determining a cooling rate.

11. The aircraft according to claim 10, wherein the controller is configured to determine the maximum brake temperature by:
    determining an amount of energy input to the brake during the braking event, based on the received torque measurement; and
    determining a thermal mass of a component of the brake, based on the received wear measurement.

12. The aircraft according to claim 10, wherein the controller is configured to determine the cooling rate based on the determined maximum brake temperature, the received ambient condition measurement, and the stored information relating to the thermal behavior of the brake.

13. The aircraft according to claim 1, wherein the controller is further configured to receive an indication of a cooling fan state, and to predict the cooling period based additionally on the received indication of a cooling fan state.

14. The aircraft according to claim 1, wherein the information relating to the thermal behavior of the brake comprises one or more of:
    information relating to a past thermal behavior of the brake;
    a time-series of measurements of the temperature of the brake;
    a mathematical model of the brake;
    a look-up table;

a mathematical relationship relating any two or more of: torque, wear, ambient condition;
cooling fan state; and
information relating the thermal behavior of the brake to the thermal behavior of a further brake.

15. The aircraft according to claim 1, wherein the controller is further configured to receive a measurement of a temperature of a further brake, and to predict the cooling period based additionally on the received further brake temperature measurement.

16. The aircraft according to claim 15, wherein the non-transitory memory further stores information relating the thermal behavior of the brake to the thermal behavior of the further brake, and wherein the controller is further configured to predict the cooling period based additionally on the information relating the thermal behavior of the brake to the thermal behavior of the further brake.

17. The aircraft according to claim 15, wherein the further brake is on an axle for the brake.

18. The aircraft of claim 1, wherein the controller is further configured to prohibit a take-off of the aircraft until after expiration of the predicted cooling period.

19. An aircraft brake cooling prediction apparatus configured to predict a brake cooling period and comprising:
a non-transitory memory storing information relating to thermal behavior of the brake, and
a controller configured to:
calculate a predicted cooling period required for the brake to reach a certain temperature condition following a braking event, wherein the calculation uses:
a torque measurement received from a torque sensor sensing a torque reacted by the brake;
a wear measurement received from a wear sensor sensing a wear state of the brake;
an ambient condition measurement received from an environmental sensor, and
the stored information relating to the thermal behavior.

20. The aircraft brake cooling prediction apparatus of claim 19, wherein the controller is further configured to prohibit a take-off of the aircraft until after expiration of the predicted cooling period.

21. The aircraft brake cooling prediction apparatus of claim 19, wherein the controller is further configured to prohibit a take-off of the aircraft until after the brake has cooled to the specific temperature.

22. A method to predict a brake cooling period comprising:
measuring a torque reacted by a brake during a braking event of an aircraft brake;
measuring wear by a wear sensor monitoring a wear state of the brake;
measuring at least one ambient condition of the environment of the brake; and
calculating by a controller a predicted cooling period required for the brake to cool to a specific temperature condition following a braking event, wherein the calculation is based on the measured torque measurement, the measured wear, the measured at least one ambient condition and information relating to thermal behavior of the brake retrieved form a non-transitory memory accessible by the controller.

23. The method of claim 22, further comprising prohibiting a take-off of the aircraft until after the predicted cooling period.

24. The method of claim 22, further comprising prohibiting a take-off of the aircraft until after the brake has cooled to the specific temperature.

25. The method of claim 22, wherein the controller is further configured to prohibit a take-off of the aircraft until after the brake has cooled to the specific temperature.

* * * * *